US009547852B2

United States Patent
Miyasaka et al.

(10) Patent No.: US 9,547,852 B2
(45) Date of Patent: Jan. 17, 2017

(54) PRINTING DEVICE, CONTROL METHOD OF A PRINTING DEVICE, AND PRINTING SYSTEM

(71) Applicant: Seiko Epson Corporation, Tokyo (JP)

(72) Inventors: Masayo Miyasaka, Shiojiri (JP); Toshiaki Koike, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/941,150

(22) Filed: Nov. 13, 2015

(65) Prior Publication Data

US 2016/0147491 A1 May 26, 2016

(30) Foreign Application Priority Data

Nov. 20, 2014 (JP) .................................. 2014-235327

(51) Int. Cl.
| | | |
|---|---|---|
| G07G 1/12 | (2006.01) | |
| G07G 5/00 | (2006.01) | |
| G06F 3/12 | (2006.01) | |
| G06Q 20/20 | (2012.01) | |
| G06K 15/02 | (2006.01) | |
| G07G 1/00 | (2006.01) | |

(52) U.S. Cl.
CPC .......... G06Q 20/209 (2013.01); G07G 1/0009 (2013.01); G07G 1/0018 (2013.01); G07G 5/00 (2013.01)

(58) Field of Classification Search
None
See application file for complete search history.

(56) References Cited

U.S. PATENT DOCUMENTS

| | | | | |
|---|---|---|---|---|
| 5,631,637 | A * | 5/1997 | Ueda ..................... | G06F 3/1293 340/14.1 |
| 8,643,854 | B2 * | 2/2014 | Saito ...................... | G06F 3/1213 358/1.13 |
| 2006/0072151 | A1 * | 4/2006 | Amani .................. | G06F 3/1203 358/1.15 |
| 2007/0011679 | A1 * | 1/2007 | Abe ..................... | G06F 11/3013 718/100 |
| 2009/0059281 | A1 * | 3/2009 | Murahashi ............ | G06F 3/1207 358/1.15 |
| 2011/0207096 | A1 * | 8/2011 | Kawaguti ............... | G09B 7/00 434/219 |
| 2012/0105907 | A1 * | 5/2012 | Song ..................... | G06F 3/1203 358/1.15 |

(Continued)

FOREIGN PATENT DOCUMENTS

| | | |
|---|---|---|
| JP | 10-312250 A | 11/1998 |
| JP | 2000-298566 A | 10/2000 |

*Primary Examiner* — Beniyam Menberu

(57) ABSTRACT

A printing device runs a process that uses resources efficiently and is compatible with configurations having multiple reception units. The printer 11 has a first immediate execution command manager 202 that monitors if an immediate execution command was stored in a first receive buffer 24, and if an immediate execution command was stored, reads and runs the immediate execution command; and a second immediate execution command manager 203 that monitors if an immediate execution command was stored in a second receive buffer 26, and if an immediate execution command was stored, reads and runs the immediate execution command.

9 Claims, 7 Drawing Sheets

(56) References Cited

U.S. PATENT DOCUMENTS

2012/0265945 A1* 10/2012 Miyasaka ............ G07G 1/0009
711/153
2014/0043624 A1* 2/2014 Wang .................... G06F 3/1215
358/1.8

* cited by examiner

PRINTING DEVICE, CONTROL METHOD OF A PRINTING DEVICE, AND PRINTING SYSTEM

Priority is claimed under 35 U.S.C. §119 to Japanese Application nos. 2014-235327 filed on November 20, which is hereby incorporated by reference in their entirety.

BACKGROUND

1. Technical Field

The present disclosure relates to a printing device, a control method of a printing device, and a printing system.

2. Related Art

JP-A-H10-312250 describes a printing device (image forming devices) that has multiple reception units (interfaces) and uses a separate processing program for each reception unit to process data received from plural external devices through the plural reception units.

As in the above printing device, there is a need for a device having plural reception units to execute a process compatible with a configuration having multiple reception units and use storage resources and computing resources effectively.

SUMMARY

A printing device with multiple reception units, a control method of the printing device, and a printing system including the printing device according to the disclosure execute a process compatible with configurations having plural reception units.

A printing device according to one aspect of the disclosure has a print unit that prints on a recording medium; a first reception unit that receives data; a first receive buffer that stores data received by the first reception unit; a second reception unit that receives data; a second receive buffer that stores data received by the second reception unit; a print control unit that switches the target buffer to either the first receive buffer or the second receive buffer, and controls the print unit based on data stored in the buffer selected as the target buffer; a first immediate execution command manager that monitors if an immediate execution command was stored in the first receive buffer, and if an immediate execution command was stored, reads and runs the immediate execution command; and a second immediate execution command manager that monitors if an immediate execution command was stored in the second receive buffer, and if an immediate execution command was stored, reads and runs the immediate execution command.

Thus comprised, the printing device can execute a process for handling configurations with multiple reception units.

In a printing device according to another aspect of the disclosure, the first immediate execution command manager does not delete the immediate execution command that was read and run from the first receive buffer; the second immediate execution command manager deletes the immediate execution command that was read and run from the second receive buffer; and the print control unit reads the immediate execution command stored in the first receive buffer, and does not run the read immediate execution command.

This aspect of the disclosure improves processing efficiency.

In a printing device according to another aspect of the disclosure, when data is stored in the second receive buffer, the print control unit changes the target buffer to the second receive buffer after a specific time has past after control of the print unit based on data stored in the first receive buffer is completed.

Thus comprised, the target buffer can be changed from the first receive buffer to the second receive buffer after reliably completing processing based on data stored in the first receive buffer.

In a printing device according to another aspect of the disclosure, data contains plural commands; and when data is stored in the second receive buffer, the print control unit changes the target buffer to the second receive buffer after completing control of the print unit based on a specific command in the commands included in the data stored in the first receive buffer.

This aspect of the disclosure improves process efficiency and can shorten the time required for processing.

Another aspect of the disclosure is a printing system including a POS terminal that sends data for producing a receipt, a control device that sends data for producing a ticket, and a printing device. The printing device has a print unit that prints on a recording medium, cuts the recording medium, and produces the receipt or the ticket; a first reception unit that receives data from the POS terminal; a first receive buffer that stores data received by the first reception unit; a second reception unit that receives data from the control device; a second receive buffer that stores data received by the second reception unit; a print control unit that switches the target buffer to either the first receive buffer or the second receive buffer, and controls the print unit based on data stored in the buffer selected as the target buffer; a first immediate execution command manager that monitors if an immediate execution command was stored in the first receive buffer, and if an immediate execution command was stored, reads and runs the immediate execution command; and a second immediate execution command manager that monitors if an immediate execution command was stored in the second receive buffer, and if an immediate execution command was stored, reads and runs the immediate execution command.

Thus comprised, the printing device can execute a process for handling configurations with multiple reception units.

In a printing system according to another aspect of the disclosure, the first immediate execution command manager does not delete the immediate execution command that was read and run from the first receive buffer; the second immediate execution command manager deletes the immediate execution command that was read and run from the second receive buffer; and the print control unit reads the immediate execution command stored in the first receive buffer, and does not run the read immediate execution command.

This aspect of the disclosure improves processing efficiency.

In a printing system according to another aspect of the disclosure, when data is stored in the second receive buffer, the print control unit changes the target buffer to the second receive buffer after a specific time has past after control of the print unit based on data stored in the first receive buffer is completed.

Thus comprised, the target buffer can be changed from the first receive buffer to the second receive buffer after reliably completing processing based on data stored in the first receive buffer.

In a printing system according to another aspect of the disclosure, data contains plural commands; and when data is stored in the second receive buffer, the print control unit changes the target buffer to the second receive buffer after completing control of the print unit based on a specific command in the commands included in the data stored in the first receive buffer.

This aspect of the disclosure improves process efficiency and can shorten the time required for processing.

Other objects and attainments together with a fuller understanding of the disclosure will become apparent and appreciated by referring to the following description and claims taken in conjunction with the accompanying drawings.

DESCRIPTION OF EMBODIMENTS

Preferred embodiments of the present disclosure are described below with reference to the accompanying figures.

Figure 1:
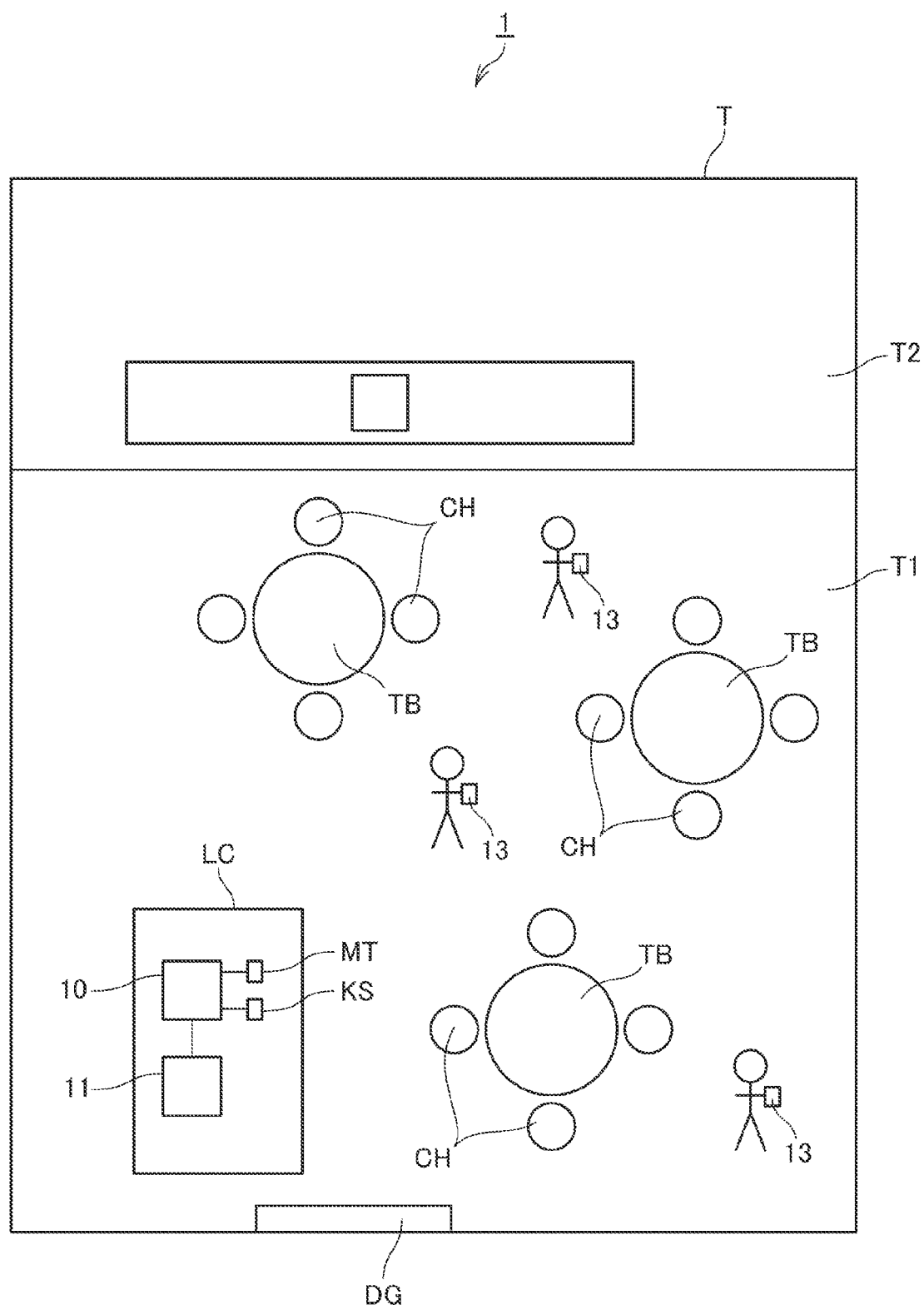
FIG. 1 shows an example of a printing system according to a preferred embodiment of the disclosure.

FIG. 1 illustrates the configuration a printing system 1 according to the first embodiment of the disclosure.

FIG. 1 shows an example of a printing system 1 according to the disclosure deployed in a restaurant T that serves food and drinks to customers.

The restaurant T shown in FIG. 1 is divided into a dining room T1 and a kitchen T2.

The dining room T1 is where customers of the restaurant T sit and where the wait staff (referred to below as waiters) in the dining room T1 serve food and drinks to the customers. Multiple waiters work in the dining room T1. Multiple tables TB where food and drinks can be placed are arranged in the dining room T1, and multiple chairs CH where the customers sit are placed at each table TB.

A checkout counter LC where customers pay for their bill is located near the exit DG from the dining room T1. A POS terminal 10 and a printer 11 connected by wire to the POS terminal 10 are installed at the checkout counter LC. Devices connected to the POS terminal 10 include a monitor MT and a cash drawer KS.

A waiter inputs information to the POS terminal 10 to process a customer payment (transaction). The POS terminal 10 controls the monitor MT and cash drawer KS appropriately to the input to display information related to the transaction on the monitor MT and make change as needed using the cash drawer KS. The POS terminal 10 also controls the printer 11 and causes the printer 11 to produce a receipt. The receipt produced by the printer 11 is then given to the customer.

A tablet terminal 13 (control device) used to take customer orders is previously assigned to each of the plural waiters. A tablet terminal 13 is a tablet computer with a touch panel 41 on the front.

When an order is received from a customer in the dining room T1, a waiter goes to the customer, takes the order, and inputs the order to the tablet terminal 13. Once the order has been received, the waiter goes to near the checkout counter LC where the tablet terminal 13 and the printer 11 connect wirelessly by Bluetooth®. The waiter then makes a specific input to the tablet terminal 13. In response to this input, the tablet terminal 13 controls the printer 11 to produce an order ticket showing at least the name of each ordered item and the quantity ordered. The waiter then places the order ticket produced by the printer 11 at a specific place in the kitchen T2.

The kitchen T2 is the area where the ordered items are prepared by workers in the kitchen T2 ("kitchen staff" below), and has a drink machine, stove, refrigerator, and other appliances. The kitchen staff take the order ticket placed at the specific position by the waiter, and check and prepare the ordered menu items based on the order ticket. The kitchen staff then pass the prepared items to the waiter, who delivers the items to the customer.

Figure 2:
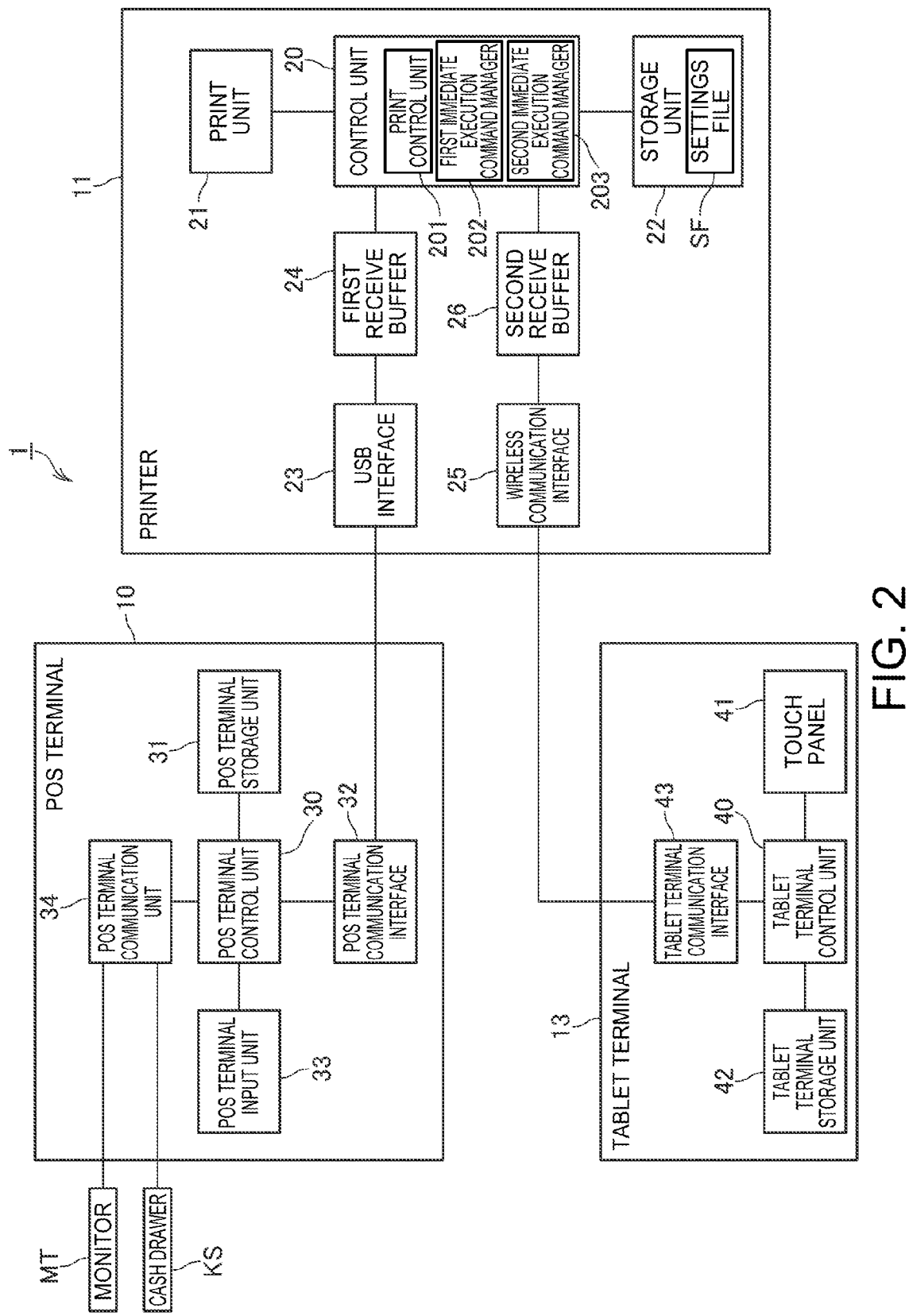
FIG. 2 is a block diagram showing the functional configuration of devices in the printing system.

FIG. 2 is a block diagram showing the functional configuration of devices in the printing system 1.

The printer 11 is a line thermal printer that holds roll paper (recording media) and prints images by forming dots on the roll paper, which in this example is thermal roll paper, by a thermal line head.

As shown in FIG. 2, the printer 11 has a control unit 20, print unit 21, storage unit 22, a USB interface 23 (first reception unit), first receive buffer 24, wireless communication interface 25 (second reception unit), and a second receive buffer 26.

The control unit 20 includes a CPU, ROM, RAM, and other peripheral circuits, and controls the printer 11. The control unit 20 functions as a print control unit 201, a first immediate execution command manager 202, and a second immediate execution command manager 203 by reading and running a specific control program. The print control unit 201 is described further below.

The print unit 21 includes a conveyance mechanism that conveys the roll paper stored inside the case of the printer 11, a print mechanism that forms dots and prints images on the roll paper with a thermal head, and a cutter mechanism that cuts the roll paper at a specific position. The print unit 21 prints on the roll paper with the print mechanism while conveying the roll paper with the conveyance mechanism, and then cuts the roll paper at a specific position by the cutter mechanism to produce the receipts and order tickets described above as controlled by the control unit 20.

The storage unit 22 comprises nonvolatile memory, and stores data. The storage unit 22 stores a settings file SF. The settings file SF is described further below.

The USB interface 23 has an interface board with a USB port, and communicates according to the USB protocol with the POS terminal 10 through a USB cable connected to the USB port as controlled by the control unit 20.

The first receive buffer 24 is a buffer that stores the data the USB interface 23 receives from the POS terminal 10.

The wireless communication interface 25 includes a wireless communication module with a wireless communication function conforming to the Bluetooth standard, and communicates wirelessly according to Bluetooth with the tablet terminal 13 as controlled by the control unit 20.

The second receive buffer 26 is a buffer that stores the data the wireless communication interface 25 receives from the tablet terminal 13.

The POS terminal 10 is a host computer that controls the printer 11.

As shown in FIG. 2, the POS terminal 10 has a POS terminal control unit 30, POS terminal storage unit 31, POS terminal communication interface 32, POS terminal input unit 33, and a POS terminal communication unit 34.

The POS terminal control unit 30 has a CPU, ROM, RAM, and other peripheral circuits, and controls the POS terminal 10.

The POS terminal storage unit 31 has nonvolatile memory, and stores data.

The POS terminal communication interface 32 communicates by USB with the printer 11 as controlled by the POS terminal control unit 30.

The POS terminal input unit 33 has an input unit such as a keypad or operating switches, detects input to the input unit, and outputs to the POS terminal control unit 30. The POS terminal control unit 30 executes processes appropriate to the input based on the input from the POS terminal input unit 33.

The POS terminal communication unit 34 communicates with devices connected to the POS terminal 10 as controlled by the POS terminal control unit 30. Devices connected to the POS terminal 10 include a monitor MT and a cash drawer KS in this example.

The monitor MT has a display means such as an LCD panel, and displays images on the display means as controlled by the POS terminal control unit 30.

The cash drawer KS has a tray for holding cash, a drawer mechanism that pulls the tray from the cabinet, and a lock mechanism that locks the tray. The cash drawer KS unlocks the lock mechanism and pulls the tray from the cabinet by the drawer mechanism as controlled by the POS terminal control unit 30.

The tablet terminal 13 is a tablet computer with a touch panel 41 on the front.

As shown in FIG. 2, the tablet terminal 13 includes a tablet terminal control unit 40, a touch panel 41, a tablet terminal storage unit 42, and a tablet terminal communication interface 43.

The tablet terminal control unit 40 includes a CPU, ROM, RAM, and other peripheral circuits, and controls the tablet terminal 13.

The touch panel 41 includes an LCD panel or other type of display panel, and a touch sensor disposed over the display panel. The display panel displays images as controlled by the tablet terminal control unit 40. The touch sensor detects touch operations and outputs to the tablet terminal control unit 40. The tablet terminal control unit 40 executes processes appropriate to the touch operation based on the input from the touch panel 41.

The tablet terminal storage unit 42 includes nonvolatile memory, and stores data.

The tablet terminal communication interface 43 communicates with the printer 11 by wireless Bluetooth communication as controlled by the tablet terminal control unit 40.

The operation of the POS terminal 10 and the printer 11 when producing a receipt is described next with reference to the flow chart in FIG. 3.

In this embodiment of the disclosure as described further below, processing switches between using the first receive buffer 24 and second receive buffer 26, and the printer 11 executes the process for producing a receipt when the first receive buffer 24 is used. For brevity in the following description using the flow chart in FIG. 3, however, the first receive buffer 24 remains continuously selected for use.

As described above, when processing a customer transaction at the checkout counter LC, the waiter uses a keypad or other device of the POS terminal 10 to input the relevant transaction information. Based on the input, the POS terminal 10 controls the monitor MT and cash drawer KS to display transaction-related information on the monitor MT, and to receive payment and make change using the cash drawer KS.

Figure 3A:
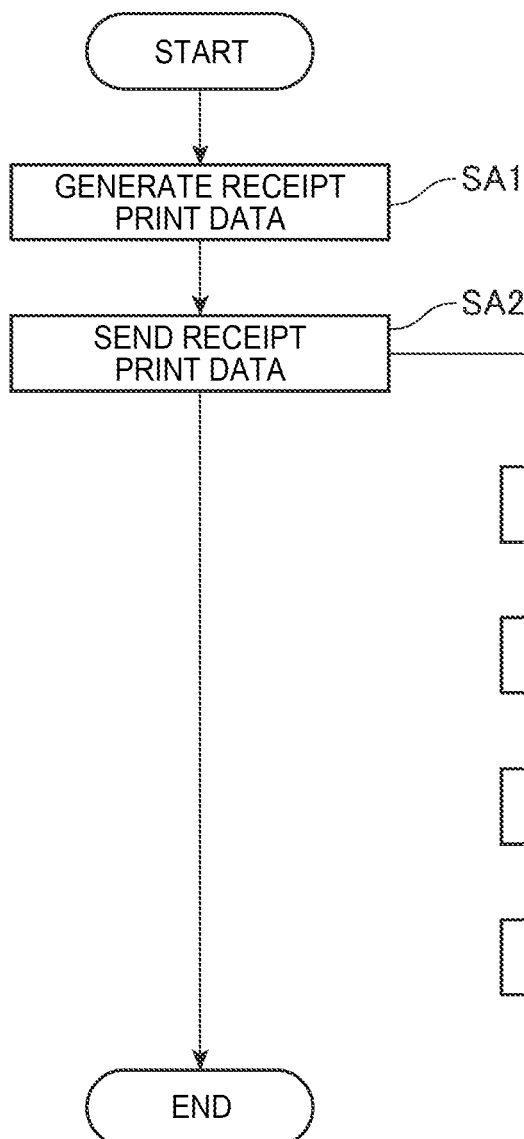
FIGS. 3A and 3B are flow charts showing the operation of a POS terminal and the printing device.

As shown in FIG. 3A, the POS terminal control unit 30 of the POS terminal 10 executes a payment process according to the customer transaction, and generates control data (receipt print data) instructing producing a receipt based on the payment process (step SA1).

More specifically, the function blocks of the POS terminal 10 include a POS application execution unit that runs a POS application, and a printer driver execution unit that runs a printer driver.

More specifically, the POS application execution unit generates receipt information containing information to record on the receipt according to the customer's transaction. The receipt information is information including, for example, information related to a logo printed on the receipt; when the receipt is printed (date and time); information related to the names, prices, quantities, and applicable tax for the products the customer purchased; the purchase total; the amount received from the customer; the amount of change due; or other information. The POS application execution unit generates the receipt information based on input by the waiter to the keypad or other input device. After generating the receipt information, the POS application execution unit outputs the receipt information to the printer driver execution unit.

The printer driver execution unit generates receipt print data in the command language of the printer 11 based on the input receipt information. The receipt print data is data comprising plural control commands in the command language of the printer 11.

After generating the receipt print data, the POS terminal control unit 30 controls the POS terminal communication interface 32 to send the generated receipt print data to the printer 11 (step SA2).

Figure 3B:
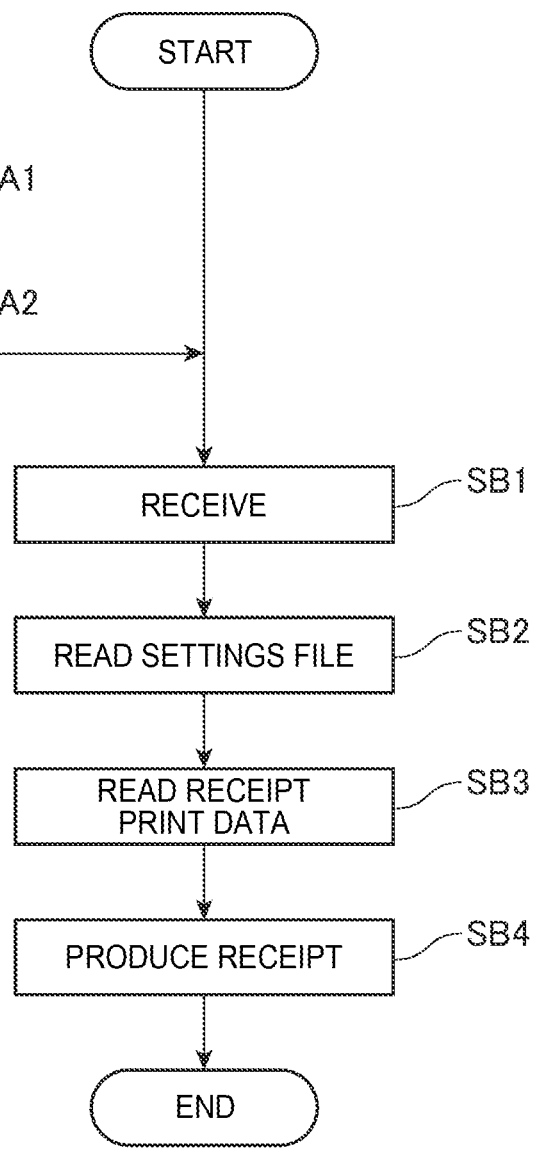

As shown in FIG. 3B, the USB interface 23 of the printer 11 receives and stores the receipt print data in the first receive buffer 24 (step SB1).

The print control unit 201 of the control unit 20 then references the settings file SF stored in the storage unit 22 (step SB2).

The settings file SF contains multiple sets of parameters to set and the values to set for those parameters (referred to below as simply "settings").

In this example, the types of settings include image settings and operating settings.

The image settings contain information that affects the appearance of the final image printed on the recording medium. Examples of such image settings include left, right, top, and bottom margins, the font face, and the line spacing.

The image settings are previously stored by a specific means according to the layout of the receipt.

The operating settings include information affecting the operation of the printer 11 when running the printing process. Examples of the operating settings include the print density and the printing speed.

The information contained in the settings file SF can be changed by the user at any time using a specific means.

After referencing the settings file SF, the print control unit 201 reads the receipt print data stored in the first receive buffer 24 (step SB3).

Next, the print control unit 201 controls the print unit 21 to produce a receipt based on the read receipt print data according to the settings (image settings and operating settings) recorded in the settings file SF (step SB4).

The operation of the tablet terminal 13 and the printer 11 when producing an order ticket is described next with reference to the flow chart in FIG. 4.

In this embodiment of the disclosure as described further below, processing switches between using the first receive buffer 24 and second receive buffer 26, and the printer 11 executes the process for producing an order ticket when the second receive buffer 26 is used. For brevity in the following description using the flow chart in FIG. 4, however, the second receive buffer 26 remains continuously selected for use.

A specific native application is pre-installed to the tablet terminal 13. Below, the functions of the tablet terminal control unit 40 of the tablet terminal 13 are embodied by the native application and associated programs.

As described above, the waiter receives an order from a customer, and inputs the order content through a specific user interface provided by a function of the native application. After receiving the order, the waiter goes near the checkout counter LC, and the tablet terminal 13 and printer 11 connect wirelessly by Bluetooth. When connecting wirelessly, the tablet terminal 13 and printer 11 are paired according to the Bluetooth protocol, a communication link is established therebetween, and the devices can exchange data. After the tablet terminal 13 and printer 11 connect wirelessly, the waiter executes a specific input to the user interface.

Figure 4A:
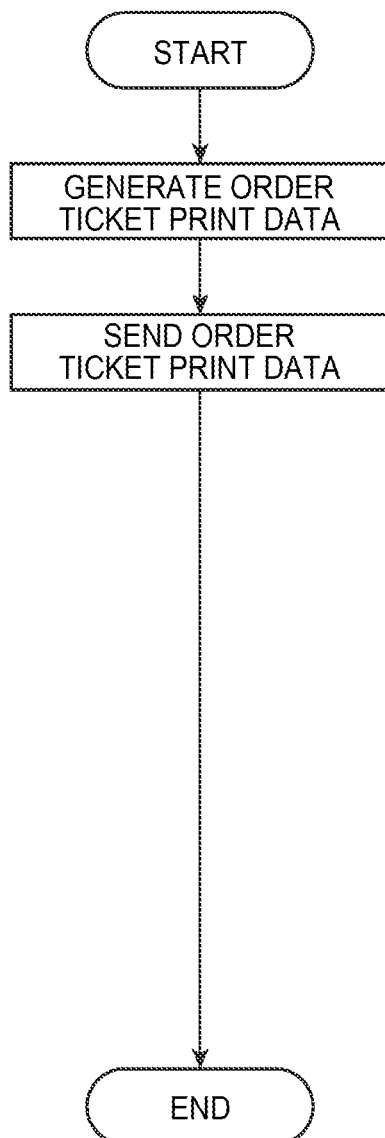
FIGS. 4A and 4B are flow charts showing the operation of a tablet terminal and the printing device.

As shown in FIG. 4A, the tablet terminal control unit 40 generates control data ("order ticket print data" below) instructing printing an order ticket in response to specific input to the user interface (step SC1).

As described above, an order ticket is a ticket on which at least the names and quantities of the ordered items are printed. The native application includes the POS application described above, and a program with the same functionality as the printer driver. The tablet terminal control unit 40 generates the order ticket print data by a function of the native application.

The order ticket print data is data comprising plural control commands in the command language of the printer 11. More specifically, the first control command in the order ticket print data is a rewrite settings file command. The rewrite settings file command is described further below.

After generating the order ticket print data, the tablet terminal control unit 40 controls the tablet terminal communication interface 43 to send the order ticket print data to the printer 11 (step SC2).

Figure 4B:
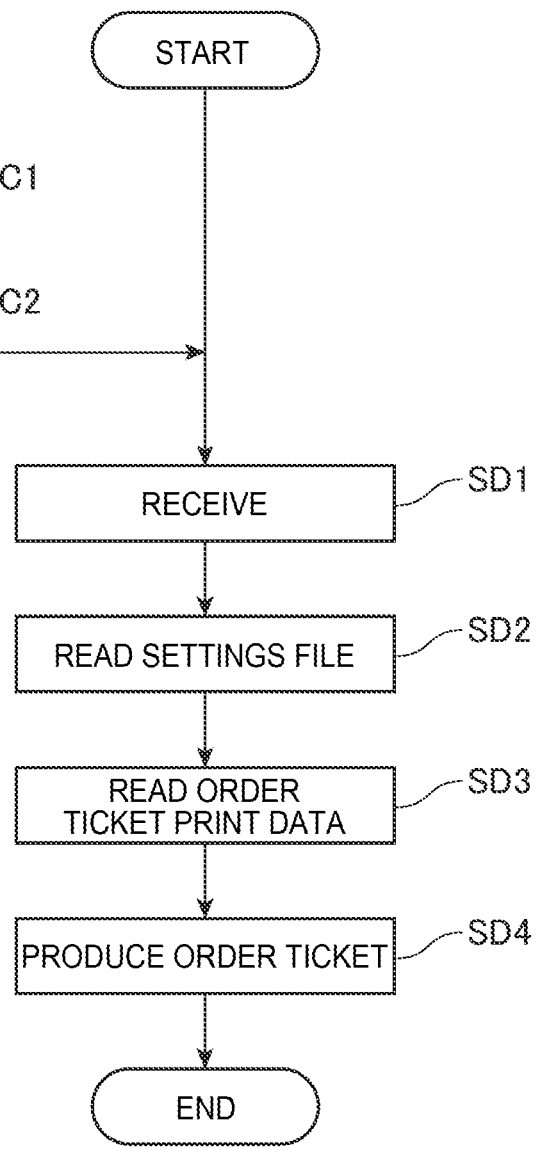

As shown in FIG. 4B, the wireless communication interface 25 of the printer 11 receives and stores the order ticket print data in the first receive buffer 24 (step SD1).

The print control unit 201 of the control unit 20 then references the settings file SF stored in the storage unit 22 (step SD2).

Next, after referencing the settings file SF, the print control unit 201 reads the order ticket print data stored in the second receive buffer 26 (step SD3).

Next, the print control unit 201 controls the print unit 21 to produce an order ticket based on the read order ticket print data according to the settings (image settings and operating settings) recorded in the settings file SF (step SD4).

The system ("POS system" below) comprising the POS terminal 10 and printer 11 in the restaurant T is a pre-existing system and transactions were processed using the POS system. The order tickets were previously created by the waiter writing the order information on paper media by hand. The printing system 1 according to this embodiment of the disclosure reduces the work load of the wait staff by the printer 11 printing the order tickets in addition to receipts.

The work load of the wait staff can conceivably be reduced by installing a new dedicated device with the ability to produce tickets in the restaurant T, and using this dedicated device to produce order tickets. However, because this configuration requires a dedicated device, the cost of the system increases.

By producing both receipts and order tickets with the printer 11, this embodiment of the disclosure prevents the cost increases incurred by providing a dedicated device to produce order tickets. However, this creates the following problems and needs.

More specifically, because the POS system is an existing system, it is desirable to minimize modifications of the POS terminals 10 in the POS system, including modification of the installed POS application program and the printer driver program. Modifying the POS terminals 10 creates work to implement the changes, and increases the work load on the system administrator.

The existing POS system is a system in which there is a continuous one-to-one connection between the POS terminal 10 and the printer 11. It is therefore necessary to enable producing order tickets by the printer 11 as controlled by the tablet terminal 13 while maintaining the ability of the POS terminal 10 to control printing receipts from the printer 11. Furthermore, the image settings recorded in the settings file SF of the printer 11 relate to the layout of the receipt and are not content (settings) related to the layout of the order tickets, and a process for handling these different settings is required.

Furthermore, because the existing printers 11 are used, it is also necessary to use the storage resources and computing resources of the printer 11 effectively instead of increasing the storage capacity of the printer 11 or replacing the CPU with a more powerful CPU.

To solve these problems and needs, the printer 11 according to this embodiment of the disclosure executes the process described below.

Figure 5:
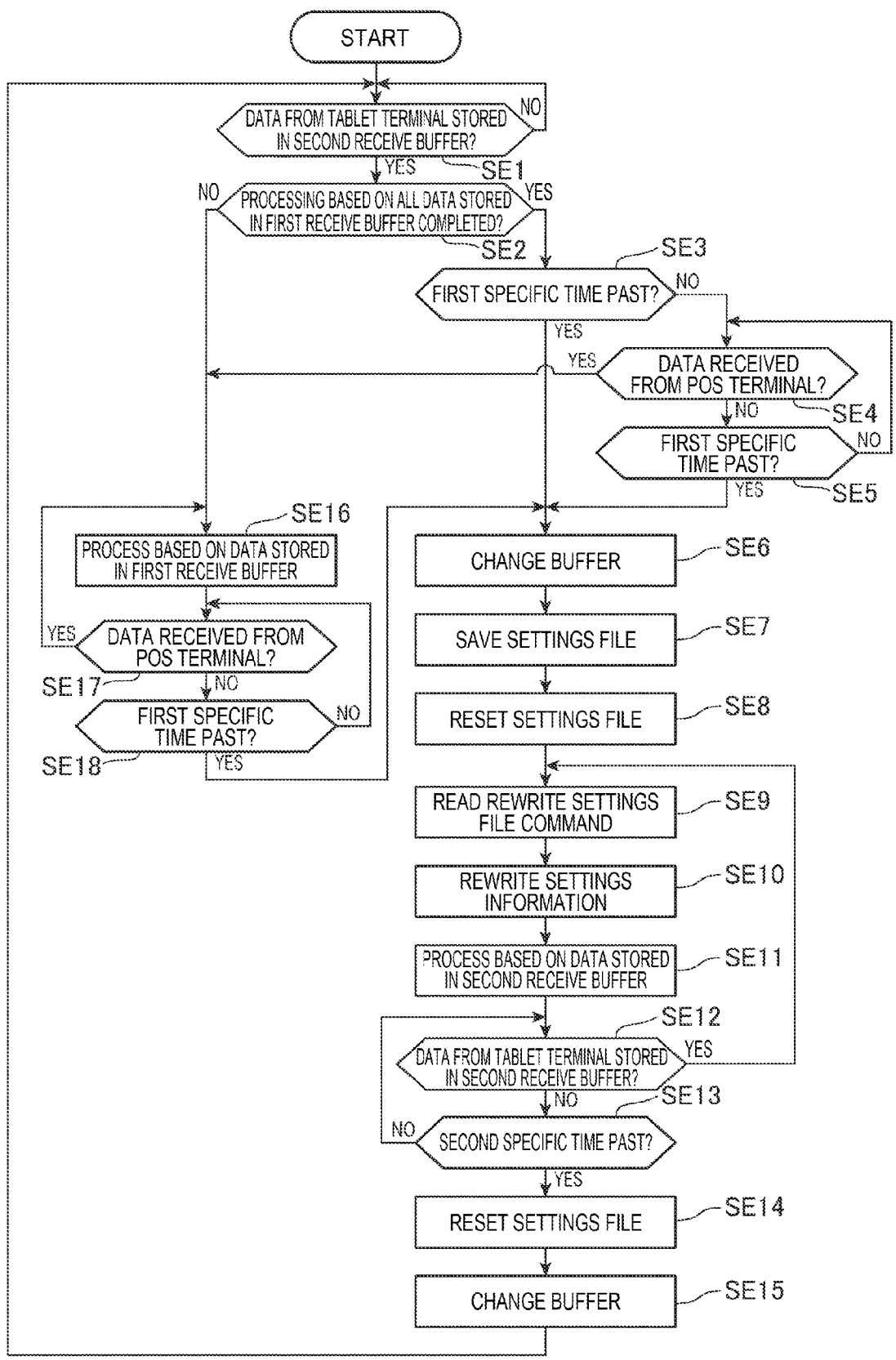
FIG. 5 is a flow chart showing the operation of the printing device.

FIG. 5 is a flow chart describing the operation of the printer 11.

As described below, the print control unit 201 of the control unit 20 of the printer 11 switches the target buffer between the first receive buffer 24 and second receive buffer 26. When the operation of the flow chart in FIG. 5 starts, the buffer used for processing (the target buffer) is the first receive buffer 24.

As shown in FIG. 5, the print control unit 201 monitors whether or not new order ticket print data is received from the tablet terminal 13 and stored in the second receive buffer 26 (step SE1). As described above, when order ticket print data is received, the wireless communication interface 25 sequentially stores the received order ticket print data in the second receive buffer 26.

The print control unit 201 monitors the state of the first receive buffer 24 and second receive buffer 26 and can detect when new data is stored in either buffer.

When order ticket print data is stored in the second receive buffer 26 (step SE1: YES), the print control unit 201 determines whether or not all of the receipt print data stored in the first receive buffer 24 has been read, and processing based on all of the receipt print data (producing a receipt) is completed (step SE2). Processing having completed includes the print control unit 201 ending control of the print unit 21 based on data stored in the first receive buffer 24.

If processing based on all receipt print data stored in the first receive buffer 24 is not completed (step SE2: NO), the print control unit 201 goes to step SE16. Step SE16 is described further below.

If processing based on all receipt print data stored in the first receive buffer 24 is completed (step SE2: YES), the print control unit 201 determines if a previously set first specific time has passed since the process ended (step SE3). The print control unit 201 has a clock function for counting the time past after processing ends when the last process based on the receipt print data is completed. In step SE3, the print control unit 201 compares the elapsed time with the previously set first specific time, and based on the result determines whether or not the previously set first specific time has passed since the process ended.

If the first specific time has already past (step SE3: YES), the print control unit 201 goes to step SE6. As will be understood below, the print control unit 201 immediately changes the target buffer from the first receive buffer 24 to the second receive buffer 26 for processing.

If the first specific time has not past (step SE3: NO), the print control unit 201 monitors if new receipt print data was received from the POS terminal 10 and stored in the first receive buffer 24 (step SE4) while continuing to monitor if the first specific time has past since the last process based on the receipt print data stored in the first receive buffer 24 was completed (step SE5).

If newly received receipt print data is stored in the first receive buffer 24 before the specific time passes (step SE4: YES), the print control unit 201 goes to step SE16. In this event, as will be understood below, the print control unit 201 does not change the buffer used as the target buffer, and prioritizes processing based on the receipt print data stored in the first receive buffer 24.

If the first specific time passes before new receipt print data is received (step SE5: YES), the print control unit 201 goes to step SE6.

In step SE6, the print control unit 201 switches the buffer used as the target buffer from the first receive buffer 24 to the second receive buffer 26.

Switching the buffer used as the target buffer means changing the buffer from which data is read from one buffer to the other buffer. When the first receive buffer 24 is the target buffer, the print control unit 201 reads and processes data (receipt print data) from the first receive buffer 24. When the second receive buffer 26 is the target buffer, the print control unit 201 reads and processes data (order ticket print data) from the second receive buffer 26.

Why the buffer is changed after waiting a specific time after processing data stored in the first receive buffer 24 is completed is described next.

As described above, the receipt print data is data containing multiple control commands. There may therefore be a time lag between when the first control command is stored in the first receive buffer 24 and when the next control command after the first control command is stored in the first receive buffer 24. The control commands contained in the receipt print data for producing one receipt must also be executed in a single continuous operation. If the commands are not executed in a single continuous operation, the receipt may not be produced correctly. The buffer is therefore changed after waiting a specific time after processing based on the data stored in the first receive buffer 24 is completed so that the control commands contained in the receipt print data for producing one receipt are executed continuously even if there is a time lag in storing the control commands contained in the receipt print data for the one receipt in the first receive buffer 24.

After switching the target buffer in step SE6 from the first receive buffer 24 to the second receive buffer 26, the print control unit 201 stores a copy of the settings file SF to a specific storage area (step SE7). The operation of step SE7 is equivalent to saving the settings file SF.

Next, the print control unit 201 resets the image settings of the settings file SF (step SE8). Resetting the image settings means setting the value of each parameter in the image settings to the default value.

Next, the print control unit 201 reads the rewrite settings file command, which is the first control command, from the control commands contained in the order ticket print data stored in the second receive buffer 26 (step SE9).

The rewrite settings file command is a control command for rewriting the image settings stored in the settings file SF. Rewriting the image settings means setting each of the parameters in the image settings to a specific value. The rewrite settings file command contains information indicating each parameter in the image settings and the value set for each parameter. The information indicating the combinations of parameters and values are previously registered in the tablet terminal 13 by a specific method. When generating order ticket print data, the tablet terminal 13 generates a rewrite settings file command based on the registered information.

Next, the print control unit 201 executes the rewrite settings file command that was read, and rewrites the image settings in the settings file SF (step SE10).

The image settings of the settings file SF are thus reset when changing the target buffer from the first receive buffer 24 to the second receive buffer 26 in this example. The image settings are then rewritten based on the rewrite settings file command contained in the order ticket print data stored in the second receive buffer 26. As a result, the content of the image settings can be changed appropriately to an order ticket.

When changing the target buffer from the first receive buffer 24 to the second receive buffer 26 in this example, the operating settings recorded in the settings file SF are not reset and cannot be rewritten by the rewrite settings file command. The reason why is described below.

As described above, the operating settings are settings such as the print density and printing speed that affect the operation of the printer 11 when executing the printing process. As a result, the operating settings are typically set appropriately to the individual differences between printers 11 and the actual business operations of the restaurant T based on such feedback as the actual printout when producing a receipt. The operating settings therefore preferably do not change according to the type of ticket produced, and the same information is used regardless of the type of ticket produced.

Note that when a control command for rewriting the operating settings is contained in the rewrite settings file command, the print control unit 201 discards that control command without executing it. This prevents rewriting the operating settings when changing the target buffer.

After rewriting the image settings, the print control unit 201 controls the print unit 21 and causes the print unit 21 to produce an order ticket by referencing the settings file SF and sequentially reading and executing the control commands contained in the order ticket print data stored in the second receive buffer 26 (step SE11).

After all order ticket print data has been read and the process of producing an order ticket based on the order ticket print data is completed, the print control unit 201 monitors whether or not new order ticket print data received from the tablet terminal 13 was stored in the second receive buffer 26 (step SE12) while monitoring if a second specific time has past since the order ticket printing process ended (step SE13).

This second specific time may be the same as the first specific time described above or different.

If new order ticket print data is received and stored in the second receive buffer 26 before the second specific time passes (step SE12: YES), the print control unit 201 returns to step SE9, rewrites the settings file SF based on the rewrite settings file command, and produces an order ticket based on the order ticket print data.

If the second specific time passes without receiving new order ticket print data (step SE13: YES), the print control unit 201 goes to step SE14.

In step SE14, the print control unit 201 overwrites the settings file SF based on the copy of the settings file SF stored in the specific storage area (that is, restores the settings file SF).

As a result of this step SE14, the settings file SF is restored to the state before the target buffer was changed from the first receive buffer 24 to the second receive buffer 26 in step SE6.

After restoring the settings file SF, the print control unit 201 changes the target buffer from the second receive buffer 26 to the first receive buffer 24 (step SE15).

In step SE16, the print control unit 201 executes the following process. That is, the print control unit 201 references the settings file SF, and runs a process (producing a receipt) based on the data (receipt print data) stored in the first receive buffer 24 (step SE16).

After executing the process based on the receipt print data, the print control unit 201 monitors if the first specific time has past since the process ended (step SE18) while checking if receipt print data newly received from the POS terminal 10 was stored in the first receive buffer 24 (step SE17).

If newly received receipt print data is stored in the first receive buffer 24 before the first specific time passes (step SE17: YES), the print control unit 201 goes to step SE16 and executes a process based on the newly received receipt print data.

If the first specific time passes without receiving new receipt print data (step SE18: YES), the print control unit 201 goes to step SE6. As described above, the target buffer changes from the first receive buffer 24 to the second receive buffer 26 as a result of step SE6, and processing continues based on the data stored in the second receive buffer 26.

As described above, the printer 11 executes the process described with reference to the flow chart in FIG. 5 without the data (receipt print data) sent from the POS terminal 10 to the printer 11 changing. As a result, there is no need to modify the POS terminal 10 (such as modify the installed POS application or the printer driver program).

Furthermore, the print control unit 201 of the printer 11 changes the target buffer from the first receive buffer 24 to the second receive buffer 26 if a specific time has past after processing based on the receipt print data received from the POS terminal 10 is completed when order ticket print data is received from the tablet terminal 13. The print control unit 201 then executes the process of producing an order ticket based on the order ticket print data. After printing the order ticket, the print control unit 201 changes the target buffer from the second receive buffer 26 to the first receive buffer 24. As a result, receipts can be printed normally by the printer 11 as controlled by the POS terminal 10 while order tickets can also be printed by the printer 11 as controlled by the tablet terminal 13.

The print control unit 201 also saves the settings file SF when changing the target buffer from the first receive buffer 24 to the second receive buffer 26, and restores the settings file SF when resetting the target buffer from the second receive buffer 26 to the first receive buffer 24. When executing a process based on the order ticket print data stored in the second receive buffer 26, the print control unit 201 first rewrites the content of the settings file SF based on the rewrite settings file command contained in the order ticket print data. As a result, the print control unit 201 can control printing using a receipt layout when printing a receipt, and can control printing using an order ticket layout when printing an order ticket.

Furthermore, the print control unit 201 in this embodiment of the disclosure operates according to the same processing program to process data received through multiple communication interfaces appropriately to the communication interface through which the data is received instead of using a different processing program for each communication interface (USB interface 23, wireless communication interface 25). There is, therefore, no need to write a processing program for each communication interface, and storage resources and computing resources can be used effectively.

This embodiment of the disclosure also does not store a settings file SF for each communication interface, and instead changes a single settings file SF as needed for use. Storage resources can therefore be used effectively.

The structure of the first receive buffer 24 and second receive buffer 26 is described next. The functions of the first immediate execution command manager 202 and second immediate execution command manager 203, and processes based on those functions, are then described.

Figure 6:
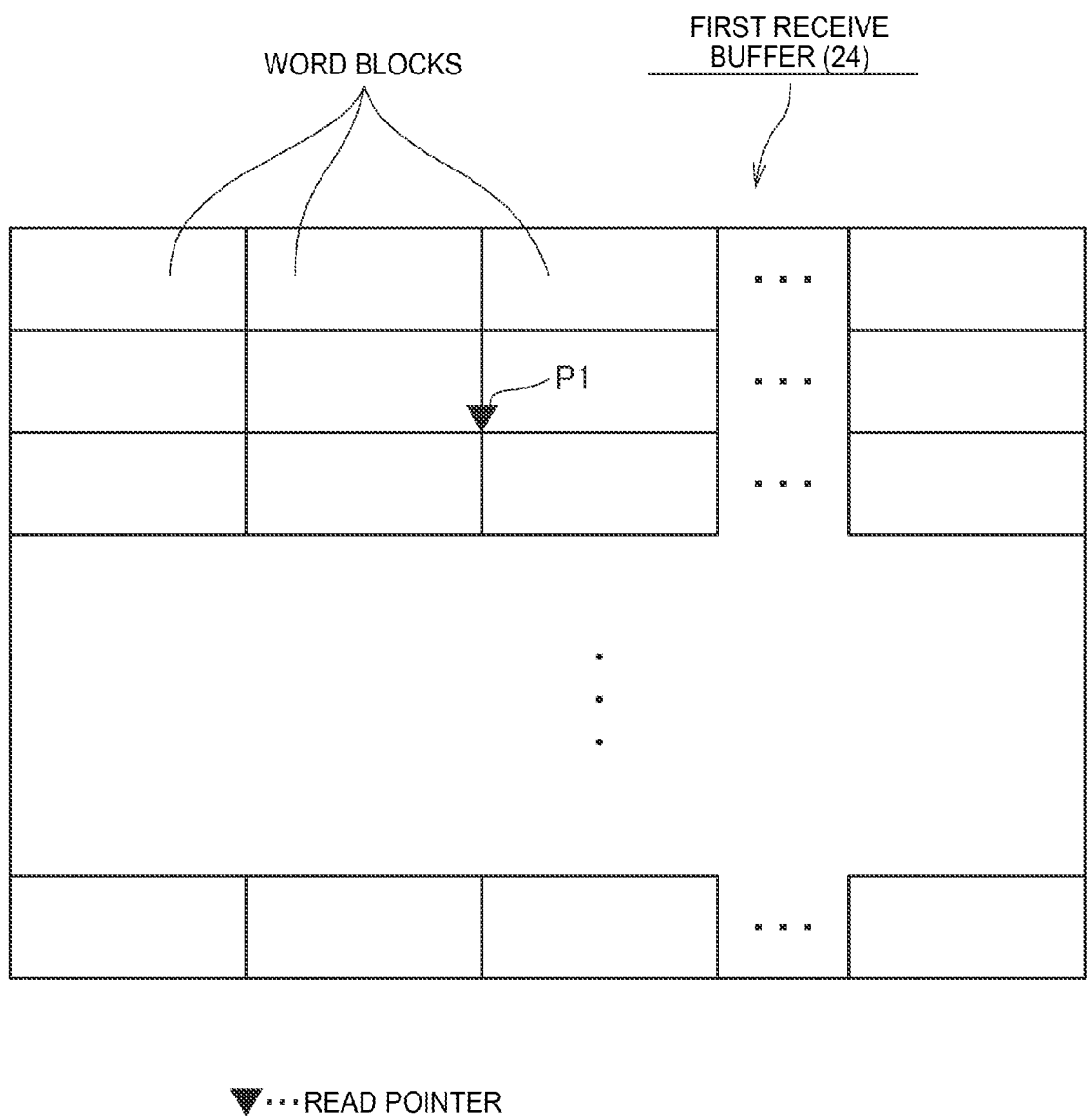
FIG. 6 shows an example of the first receive buffer.

FIG. 6 illustrates the first receive buffer 24. Note that the structure of the first receive buffer 24 is simplified in FIG. 6 for convenience describing the disclosure. In addition, the structure of the first receive buffer 24 is described below, but the second receive buffer 26 is configured identically to the first receive buffer 24.

The first receive buffer 24 is a storage area with a specific capacity. The storage area of the first receive buffer 24 is divided into word blocks, one word equal to a specific number of bits (64 bits in this embodiment of the disclosure), and a unique address is assigned to each word block. A storage area corresponding to one word is referred to below as a word block. The first receive buffer 24 in this embodiment is a ring buffer, and data is written cyclically in word units.

When reading control data from the first receive buffer 24, the print control unit 201 manages the word blocks from which the control data is read by means of a read pointer P1.

More specifically, the read pointer P1 is a pointer indicating the address of the word block for reading data from the word blocks in the first receive buffer 24. When control data has been read from the one word block corresponding to the address indicated by the read pointer P1, the print control unit 201 updates the address indicated by the read pointer P1 to the address of the word block next after the word block that was read (that is, moves the pointer). The print control unit 201 continuously reads control data from one word block and then moves the read pointer P1 to the next block. The address indicated by the read pointer P1 therefore continues to point to the address of the next word block from which control data has not been read.

The operation of the printer 11, and more specifically the functions and processes based on the functions of the first immediate execution command manager 202 and second immediate execution command manager 203, is described below with reference to FIG. 7.

Figure 7B:
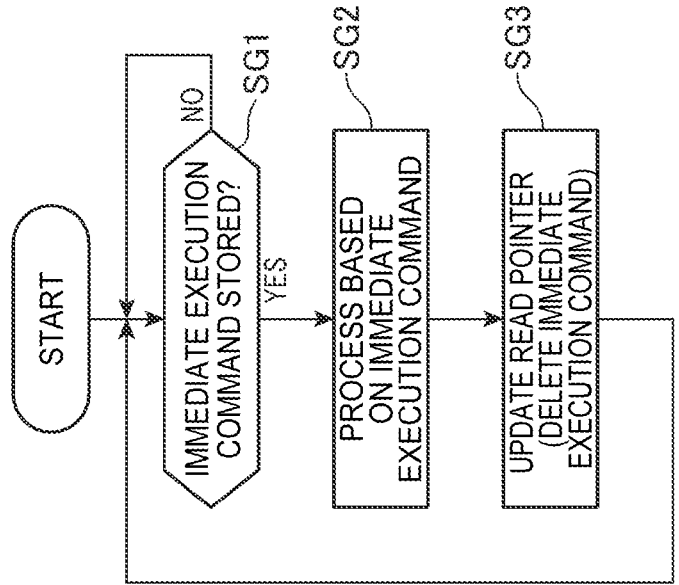
FIGS. 7A and 7B are flow charts of the operation of the printing device.
Figure 7A:
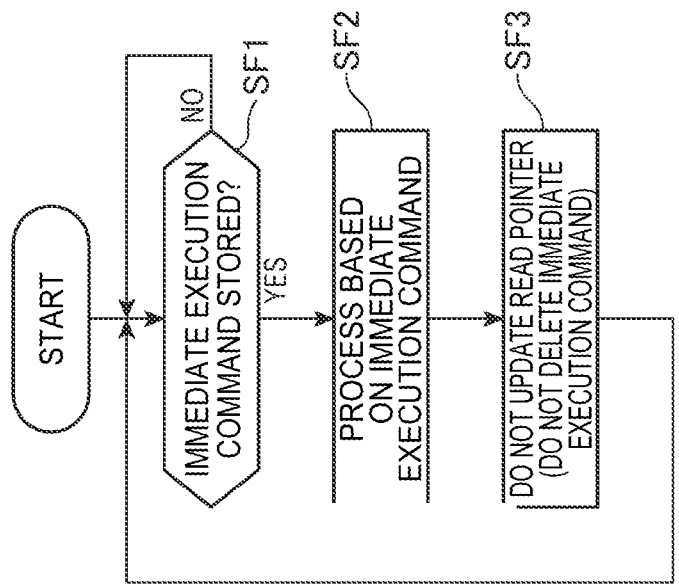

FIG. 7A is a flow chart of the operation of the first immediate execution command manager 202.

As shown in FIG. 7A, the first immediate execution command manager 202 monitors if an immediate execution command was stored in the first receive buffer 24 (step SF1).

An immediate execution command is a control command that requests immediate execution of a specific process. As will be clear below, when an immediate execution command is stored in the first receive buffer 24, the first immediate execution command manager 202 immediately reads the immediate execution command and executes a process based on the command.

Examples of immediate execution commands include a status request command requesting the printer status, a clear buffer command instructing clearing the first receive buffer 24, and an open drawer command instructing opening the cash drawer KS. Examples of printer status include if a cover of the printer 11 is open, and the error status of the print unit 21.

An immediate execution command is identified by a special command code. In step SF1, the first immediate execution command manager 202 monitors the status of the first receive buffer 24, and checks if new control data is stored in the first receive buffer 24. If new control data is stored in the first receive buffer 24, the first immediate execution command manager 202 determines based on the command code in the control data if the control data is an immediate execution command.

If an immediate execution command was stored in the first receive buffer 24 (step SF1: YES), the first immediate execution command manager 202 reads the immediate execution command from the first receive buffer 24 and executes a process based on the command (step SF2). For example, the first immediate execution command manager 202 executes the following process if the immediate execution command is a status request command. In this example, the first immediate execution command manager 202 checks the requested status based on the detection value output from a particular sensor not shown, generates data in a specific format indicating the detected status, and then controls the USB interface 23 to return the generated data. As a result of the operation of step SF2, if an immediate execution command was stored in the first receive buffer 24, the process called by that command is executed regardless of whether the current target buffer is the first receive buffer 24 or the second receive buffer 26.

After executing the process based on the immediate execution command, the first immediate execution command manager 202 returns to step SF1 without moving the read pointer P1, that is, without updating the address pointed to by the pointer (step SF3).

Note that the operation of step SF3 is equivalent to a process that does not delete the immediate execution command that was read and executed from the first receive buffer 24. That is because the immediate execution command is to be read by the print control unit 201.

When the address indicated by the read pointer P1 is not updated by the first immediate execution command manager 202 in conjunction with execution of a process based on an immediate execution command, the print control unit 201 executes the following process.

Specifically, as described above, the print control unit 201 reads control data stored in the first receive buffer 24 when the first receive buffer 24 is the target buffer. In this event, the print control unit 201 sequentially reads the control data from the control data stored in the word block pointed to by the read pointer P1. Because the address pointed to by the read pointer P1 is not updated in step SF3 after executing the process based on the first immediate execution command, the immediate execution command stored in the first receive buffer 24 will be read by the print control unit 201.

When the print control unit 201 reads an immediate execution command stored in the first receive buffer 24, the print control unit 201 recognizes that the read control data is an immediate execution command based on the command code of the immediate execution command. If the read control data is an immediate execution command, the print control unit 201 discards the immediate execution command without executing the command. More specifically, the print control unit 201 updates the address pointed to by the read pointer P1 to the word block storing the next control data after the immediate execution command without executing the immediate execution command.

As a result of the first immediate execution command manager 202 executing the above process, the same processes executed by the existing POS system (a system comprising the POS terminal 10 and printer 11) can be executed.

The print control unit 201 can also recognize receiving an immediate execution command from the POS terminal 10 and can execute an appropriate process. An example of such a process is to log the immediate execution command received from the POS terminal 10.

FIG. 7B is a flow chart of the operation of the second immediate execution command manager 203.

As shown in FIG. 7B, the second immediate execution command manager 203 checks if an immediate execution command was stored in the second receive buffer 26 (step SG1).

If an immediate execution command was stored in the second receive buffer 26 (step SG1: YES), the second immediate execution command manager 203 reads the immediate execution command from the second receive buffer 26, and executes a process based on the command (step SG2).

As a result of step SG2, a process based on the command is executed immediately when an immediate execution command is stored in the second receive buffer 26 whether or not the current target buffer is the first receive buffer 24 or the second receive buffer 26.

After executing the process based on the immediate execution command, the second immediate execution command manager 203 updates the address pointed to by the read pointer P1 (step SG3), and then returns to step SG1. More specifically, the second immediate execution command manager 203 updates the address pointed to by the read pointer P1 to the address of the word block where the control data next after the immediate execution command is stored.

Note that the operation of step SG3 is equivalent to a process that deletes the immediate execution command that was read and executed from the second receive buffer 26. This is because the immediate execution command is not for reading by the print control unit 201.

When the address pointed to by the read pointer P1 is moved by the second immediate execution command manager 203 in conjunction with execution of a process based on an immediate execution command, the immediate execution command stored in the second receive buffer 26 will not be read by the print control unit 201.

This has the following benefit.

Specifically, as described in the flow chart in FIG. 5, when data is stored to the second receive buffer 26 while the first receive buffer 24 is the target buffer, the target buffer is changed through specific steps to the second receive buffer 26. The address pointed to by the read pointer P1 is then moved by the second immediate execution command manager 203 in conjunction with execution of the process based on the immediate execution command. As a result, in the event an immediate execution command is stored in the second receive buffer 26, the print control unit 201 does not recognize that data was stored in the second receive buffer 26. Therefore, changing the target buffer to the second receive buffer 26 is therefore not triggered even if only an immediate execution command is stored in the second receive buffer 26.

Because the print control unit 201 reads and discards an immediate execution command as described above, process efficiency is improved more by not changing the target buffer than by changing the target buffer to the second receive buffer 26 and the print control unit 201 then reading and discarding the immediate execution command.

There is also no need to provide the print control unit 201 with a new function (not present in the existing POS system) for executing processes related to immediate execution commands received from the tablet terminal 13.

More specifically, unnecessarily changing the target buffer can be prevented and process efficiency can be improved by the second immediate execution command manager 203 executing the process described above.

As described above, the printer 11 according to this embodiment of the disclosure has a print unit 21 that prints on a recording medium; a USB interface 23 (first reception unit) that receives data; a first receive buffer 24 that stores data received through the USB interface 23; a wireless communication interface 25 (second reception unit) that receives data; a second receive buffer 26 that stores data received through the wireless communication interface 25; and a print control unit 201 that switches the target buffer between the first receive buffer 24 and the second receive buffer 26, and controls the print unit 21 based on data stored in the buffer selected as the target buffer.

The printer 11 has a first immediate execution command manager 202 that monitors if an immediate execution command was stored in the first receive buffer 24, and reads and runs the immediate execution command if an immediate execution command was stored; and a second immediate execution command manager 203 that monitors if an immediate execution command was stored in the second receive buffer 26, and reads and runs the immediate execution command if an immediate execution command was stored.

By thus changing the target buffer, the print control unit 201 can run processes based on data received from the POS terminal 10, and processes based on data received from the tablet terminal 13. Using functions of the first immediate execution command manager 202 and second immediate execution command manager 203, the printer 11 can also immediately execute processes based on immediate execution commands regardless of which buffer is the current target buffer. More specifically, the printer 11 can execute a process appropriate to a configuration having multiple interfaces (reception units).

In this embodiment of the disclosure, the first immediate execution command manager 202 does not delete immediate execution commands that are read and run from the first receive buffer 24. The second immediate execution command manager 203 deletes immediate execution commands that are read and run from the second receive buffer 26. The print control unit 201 reads immediate execution commands stored in the first receive buffer 24, and does not execute the immediate execution command that is read.

Thus comprised, unnecessarily changing the target buffer can be prevented and process efficiency can be improved.

When data was stored in the second receive buffer 26 in this embodiment of the disclosure, the print control unit 201 changes the target buffer to the second receive buffer 26 when a specific time has past after control of the print unit 21 based on the data stored in the first receive buffer 24 is completed.

Thus comprised, the target buffer can change from the first receive buffer 24 to the second receive buffer 26 after producing a receipt based on the receipt print data has reliably completed.

Other Embodiments

Another example of the disclosure is described below.

When the first receive buffer 24 is the target buffer and order ticket print data is received from the tablet terminal 13 in the embodiment described above, the print control unit 201 changes the buffer after waiting a specific time after completing processing all receipt print data stored in the first receive buffer 24. However, when a specific type of control command is the last control command processed in the control commands contained in the receipt print data, the print control unit 201 may immediately switch the buffer after executing the control command of the specific type without waiting for the specific time to pass. An example of such a specific type of control command is a cut command instructing cutting the roll paper.

This configuration enables changing the buffer after executing the control commands contained in receipt print data for producing one receipt in a single continuous process. Because this configuration enables switching the buffer without waiting a specific time, process efficiency is improved and the time required to complete the process can be shortened.

The disclosure is described above with reference to a preferred embodiment thereof, but the disclosure is not limited thereto and can be modified and adapted in many ways without departing from the scope of the accompanying claims.

The examples described above have two communication interfaces, a USB interface 23 and a wireless communication interface 25. The number of communication interfaces in the printer 11 is not limited to two, however, and the printer may have three or more communication interfaces.

The communication protocols of the communication interfaces are also not limited to USB and Bluetooth, and Ethernet® or a serial communication protocol such as RS-232C may be used.

Furthermore, the printing system 1 in the foregoing embodiments produces order tickets in response to requests from the tablet terminal 13, but the printouts the printer 11 produces in response to requests from devices other than the POS terminal 10 are obviously not limited to order tickets, and may be tickets printed with a queuing number or coupons, for example.

A printing system 1 deployed in a restaurant T is described in the foregoing embodiments, but the printing system 1 of the disclosure is obviously not limited to use in restaurants T.

The foregoing embodiments also describe rewriting only the image settings recorded in the settings file SF when the target buffer changes, but configurations that also change the operating settings are also conceivable.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A printing device comprising:
   a print mechanism that prints on a recording medium;
   a first receiver that receives data;
   a first receive buffer that stores data received by the first receiver;
   a second receiver that receives data;
   a second receive buffer that stores data received by the second receiver;
   a print controller that switches the target buffer to either the first receive buffer or the second receive buffer, and controls the print mechanism based on data stored in the buffer selected as the target buffer;
   a controller that (i) monitors if an immediate execution command was stored in the first receive buffer, and if an immediate execution command was stored, reads and runs the immediate execution command, and (ii) monitors if an immediate execution command was stored in the second receive buffer, and if an immediate execution command was stored, reads and runs the immediate execution command; wherein
   the controller does not delete the immediate execution command that was read and run from the first receive buffer, and deletes the immediate execution command that was read and run from the second receive buffer; and
   wherein the print controller reads the immediate execution command stored in the first receive buffer, and does not run the read immediate execution command.

2. The printing device described in claim 1, wherein:
   when data is stored in the second receive buffer, the print controller changes the target buffer to the second receive buffer after a specific time has past after control of the print mechanism based on data stored in the first receive buffer is completed.

3. The printing device described in claim 1, wherein:
   data contains plural commands; and
   when data is stored in the second receive buffer, the print controller changes the target buffer to the second receive buffer after completing control of the print mechanism based on a specific command in the commands included in the data stored in the first receive buffer.

4. A control method of a printing device including a print mechanism that prints on a recording medium, a first receiver that receives data, a first receive buffer that stores data received by the first receiver, a second receiver that receives data, and a second receive buffer that stores data received by the second receiver, the control method comprising:
   a print control step of switching the target buffer to either the first receive buffer or the second receive buffer, and controlling the print mechanism based on data stored in the buffer selected as the target buffer;
   a first immediate execution command managing step of monitoring if an immediate execution command was stored in the first receive buffer, and if an immediate execution command was stored, reading and running the immediate execution command; and
   a second immediate execution command managing step of monitoring if an immediate execution command was stored in the second receive buffer, and if an immediate execution command was stored, reading and running the immediate execution command; wherein
   the first immediate execution command managing step does not delete the immediate execution command that was read and run from the first receive buffer;
   the second immediate execution command managing step deletes the immediate execution command that was read and run from the second receive buffer; and
   the print control step reads the immediate execution command stored in the first receive buffer, and does not run the read immediate execution command.

5. The control method of a printing device described in claim 4, wherein:
   when data is stored in the second receive buffer, the print control step changes the target buffer to the second receive buffer after a specific time has past after control of the print mechanism based on data stored in the first receive buffer is completed.

6. The control method of a printing device described in claim 4, wherein:
   data contains plural commands; and
   when data is stored in the second receive buffer, the print control step changes the target buffer to the second receive buffer after completing control of the print mechanism based on a specific command in the commands included in the data stored in the first receive buffer.

7. A printing system comprising:
   a POS terminal that sends data for producing a receipt;
   a control device that sends data for producing a ticket; and
   a printing device having a print mechanism that prints on a recording medium, cuts the recording medium, and produces the receipt or the ticket,
   a first receiver that receives data from the POS terminal,
   a first receive buffer that stores data received by the first receiver,
   a second receiver that receives data from the control device,
   a second receive buffer that stores data received by the second receiver,
   a print controller that switches the target buffer to either the first receive buffer or the second receive buffer, and controls the print mechanism based on data stored in the buffer selected as the target buffer,
   a controller that (i) monitors if an immediate execution command was stored in the first receive buffer, and if an immediate execution command was stored, reads and runs the immediate execution command, and (ii) monitors if an immediate execution command was stored in the second receive buffer, and if an immediate execution command was stored, reads and runs the immediate execution command; wherein
   the controller does not delete the immediate execution command that was read and run from the first receive buffer, and deletes the immediate execution command that was read and run from the second receive buffer; and wherein the print controller reads the immediate execution command stored in the first receive buffer, and does not run the read immediate execution command.

8. The printing system described in claim 7, wherein:

when data is stored in the second receive buffer, the print controller changes the target buffer to the second receive buffer after a specific time has past after control of the print mechanism based on data stored in the first receive buffer is completed.

9. The printing system described in claim 7, wherein:

data contains plural commands; and when data is stored in the second receive buffer, the print controller changes the target buffer to the second receive buffer after completing control of the print mechanism based on a specific command in the commands included in the data stored in the first receive buffer.

* * * * *